United States Patent Office 3,096,183
Patented July 2, 1963

3,096,183
BACTERIA-RESISTANT PLASTIC MATERIALS
Hermann Genth, Krefeld-Bockum, Germany, assignor to Farbenfabriken Bayer Aktiengesellschaft, Leverkusen, Germany, a corporation of Germany
No Drawing. Filed Feb. 26, 1960, Ser. No. 11,124
Claims priority, application Germany Mar. 12, 1959
4 Claims. (Cl. 106—15)

The present invention is concerned with bacteria-resistant synthetic plastic substances or materials possessing bacteria-repellent properties, the said plastic materials being suitable for the production of shaped, molded, pressed, or formed articles or bodies by known methods.

It is known to bestow bacteria-repellent properties to synthetic plastic materials by the addition of microbicidal materials, such as, for example, the propyl ester of p-hydroxybenzoic acid (Propylparaben U.S.P.) and organic mercury compounds. The agents previously used for this purpose, such as, for example, the propyl ester of p-hydroxybenzoic acid have, to a certain extent, the disadvantage that, even when used in high concentrations, they only inhibit the growth of microorganisms but do not kill, being merely bacteriostatic rather than bactericidal in this respect. Other agents, such as the above-mentioned organic mercury compounds, which have a strong bacteriostatic effect and, furthermore, have a lethal effect upon many microorganims, are objectionable because of their very high toxicity to warm-blooded animals and humans.

We have now found that zinc pentachlorophenolate is suitable to an outstanding degree for bestowing bacteria-inhibiting properties upon synthetic plastics, such as, e.g., polyvinyl chloride, copolymers of vinyl chloride and vinyl acetate and copolymers of vinyl chloride and acrylonitrile, polyethylene, polypropylene, polystyrene, unsaturated polyesters and cellulose esters, e.g., cellulose acetobutyrate. Zinc pentachlorophenolate not only has a lethal effect on bacteria and mold fungi but also on the very widely distributed fungi such as *Trichophyton pedis* and *Candida albicans*.

The effect of the zinc pentachlorophenolate can be increased by the addition of salicyl anilide (2-phenylaminocarbonylphenol). By means of this addition, it is possible for the zinc pentachlorophenolate, which by itself is only lethally active against gram-negative bacteria, such as *Escherichia coli*, at high concentrations, to kill those bacteria even at low concentrations. Furthermore, the addition of salicyl anilide has the additional advantage substantially to suppress the tendency of the zinc pentachlorophenolate to bring about a definite discoloration of the synthetic plastic material.

The concentrations of the zinc pentachlorophenolate and salicyl anilide can fall within wide limits and depend only upon the nature of the synthetic plastic material and its intended use. As a rule, concentrations of about 1 to about 6 percent, calculated on the total weight of the final synthetic plastic material, suffice.

The incorporation of the zinc pentachlorophenolate and of the salicyl anilide into the synthetic plastic material can be carried out in the usual manner employed for the incorporation of additives such as pigments, plasticizers and catalysts. In the case of the use of plasticizers, it is frequently of particular advantage to add the microbicidal additive to the synthetic plastic material dissolved or dispersed in the plasticizer which may be, for example, aryl sulfonates of higher aliphatic hydrocarbons, dimethyl phthalate, diethyl phthalate, dibutyl phthalate, dicyclohexyl phthalate, dioctyl phthalate, tricresyl phosphate, triphenyl phosphate, dibutyl adipate, benzyl butyl adipate, aliphatic sulphonic acid esters, triglycol acetate and octyl p-hydroxybenzoate. In all cases, it is, of course, necessary to ensure a homogeneous distribution of the additives in the synthetic plastic material.

The synthetic plastic materials with bacteria-repellent properties according to the present invention can be used for the production of all manner of objects in which an outstanding effect against a large variety of microorganisms, particularly microorganisms causing suppuration, microorganisms causing putrefaction and mold fungi, is desired, such as for example, for the prodution of foot mats, hand grips, handles and doors, seating in vehicles, duckboards or trenchboards for swimming pools, wall coverings in hospitals and artificial leather covers for equipment used for carrying patients.

The durability of the microbicidal action of the synthetic plastic materials according to the invention is notable, even in the case of continuous handling of objects made therefrom with the usual washing and cleaning agents.

The following example is given for the purpose of illustrating the present invention:

A mixture of 2.5 parts by weight of zinc pentachlorophenolate and 2.5 parts by weight of salicyl anilide is stirred with 22 parts by weight of dioctyl phthalate and 73 parts by weight of polyvinyl chloride. The mixture obtained in this manner is rolled into foils at a roller temperature of 160–165° C. Apart from an enhanced effect against gram-negative microorganisms (Escherichia and Salmonella types), the foil has inhibiting and lethal effects against *Staphylococcus aureus, Bacterium cremoris, Eberthella typhi, Bacillus subtilis, Streptococcus lactis, Escherichia coli, Candida albicans, Aspergillus niger, Trichophyton pedis, Penicillium glaucum,* and *Chaetomium globosum*. Furthermore, it is characterized by a better stability against discoloration by light than a similar polyvinyl chloride material containing no salicyl anilide but twice as much zinc pentachlorophenolate.

I claim:

1. A bacteria-resistant synthetic plastic material composed of a synthetic plastic substance of the group consisting of polyvinyl chloride, copolymers of vinylchloride and vinyl acetate copolymers of vinyl chloride and acrylonitrile, polyethylene, polypropylene, polystyrene, unsaturated polyesters and cellulose esters containing between about 1 and about 6% by weight of a mixture of approximately equal parts by weight of zinc pentachlorophenolate and salicyl anilide incorporated in the said plastic material.

2. A bacteria-resistant synthetic plastic material composed of a synthetic plastic substance of the group consisting of polyvinyl chloride, copolymers of vinyl chloride and vinyl acetate, copolymers of vinyl chloride and acrylonitrile, polyethylene, polypropylene, polystyrene, unsaturated polyesters and cellulose esters, a plasticizer for the said resin, and between about 1 and about 6% by weight of a mixture of approximately equal parts by weight of zinc pentachlorophenolate and salicyl anilide incorporated in the said plastic material.

3. A molded article formed of a material consisting essentially of a synthetic plastic material as defined in claim 1.

4. A molded article formed of a material consisting essentially of a synthetic plastic material as defined in claim 2.

References Cited in the file of this patent
UNITED STATES PATENTS

| | | |
|---|---|---|
| 2,292,423 | Yohe | Aug. 11, 1942 |
| 2,439,395 | Leatherman | Apr. 13, 1948 |
| 2,457,025 | Benignus | Dec. 21, 1948 |
| 2,567,905 | Field | Sep. 11, 1951 |